(12) United States Patent
Döttling et al.

(10) Patent No.: US 7,249,303 B2
(45) Date of Patent: Jul. 24, 2007

(54) METHOD AND APPARATUS FOR TRANSFERRING DATA ACCORDING TO AN ARQ METHOD

(75) Inventors: Martin Döttling, Neubiberg (DE); Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 575 days.

(21) Appl. No.: 10/481,650

(22) PCT Filed: Oct. 17, 2001

(86) PCT No.: PCT/DE01/03964

§ 371 (c)(1),
(2), (4) Date: Dec. 22, 2003

(87) PCT Pub. No.: WO03/001730

PCT Pub. Date: Jan. 3, 2003

(65) Prior Publication Data
US 2004/0181618 A1    Sep. 16, 2004

(30) Foreign Application Priority Data
Jun. 20, 2001    (DE) ................................ 101 29 777

(51) Int. Cl.
G08C 25/02    (2006.01)
(52) U.S. Cl. ...................... 714/748; 714/776
(58) Field of Classification Search ................ 714/748, 714/762, 774, 776, 779, 790, 788
See application file for complete search history.

(56) References Cited

U.S. PATENT DOCUMENTS 6,629,286 B1 * 9/2003 Berens et al. ................ 714/755
6,711,180 B1 * 3/2004 Delesalle et al. ........... 370/474
6,765,931 B1 * 7/2004 Rabenko et al. ............ 370/493
7,031,326 B1 * 4/2006 Shur et al. .................. 370/401

FOREIGN PATENT DOCUMENTS

EP    0 771 092    5/1997

OTHER PUBLICATIONS

Narayanan et al., Physical Layer Design for Packet Data over IS-136, pp. 1029-1033.
TSG-RAN Working Group 1 Meeting ™19—Feb. 27-Mar. 2, 2001, Enhanced HARQ Method with Signal Constellation Rearrangement, pp. 1-11.

(Continued)

Primary Examiner—Donald Sparks
Assistant Examiner—Ernest Unelus
(74) Attorney, Agent, or Firm—Bell, Boyd & Lloyd LLP

(57) ABSTRACT

The present invention relates to the use of an ARQ method, especially a hybrid-ARQ-method, in order to carry out a reliable packet orientation data transfer, preferably, using a mobile radio system. When requesting a transmission data packet for the bits of the retransmission data packet, a different rate adaptation model is used in comparison with the bits corresponding originally sent data packets. A particular advantage of the present method is that the bit-rate adaptation is carried out by dividing the bits which are to be transferred into a number of partial bit flows with respectively separate bit rate adaptation.

15 Claims, 7 Drawing Sheets

OTHER PUBLICATIONS

XP-002190463—Universal Mobile Telecommunications System (UMTS), Multiplexing and channel coding (TDD) (3GPP TS 25.222 version 4.0.0 Release 4), pp. 1-50.

XP-002190464—Universal Telecommunications System (UMTS), Spreading and modulation (TDD) (3GPP TS 25.223 version 4.0.0 Release 4), pp. 1-35.

XP-002180710—Universal Mobile Telecommunications System (UMTS), RLC protocol specification (3GPP TS 25.322 version 4.0.0 Release 4), pp. 1-57.

\* cited by examiner $e = e_{ini}$
$m = 1$
$e_{plus} = e_{plus}$
do while $m <= X_i$
    $e = e - e_{minus}$
    if $e > 0$ then
        set bit $x_{i,m}$ to $\delta$ where $\delta \notin \{0,1\}$
    else
        do
            select bit $x_{i,m}$
            $e = e + e_{plus}$
        while $e <= 0$
    end if
    $m = m + 1$
end do

A)

C)

B)

D)

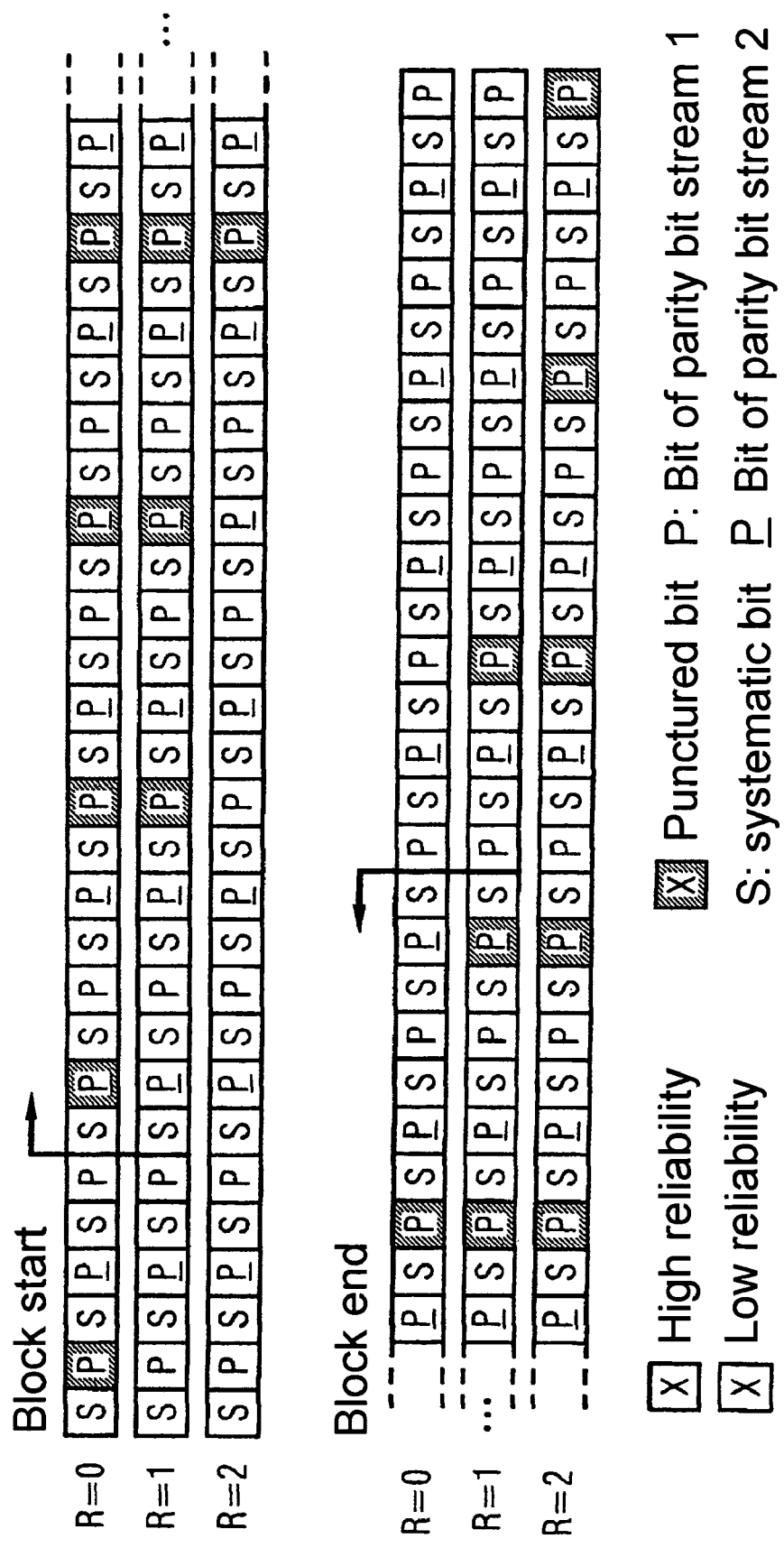

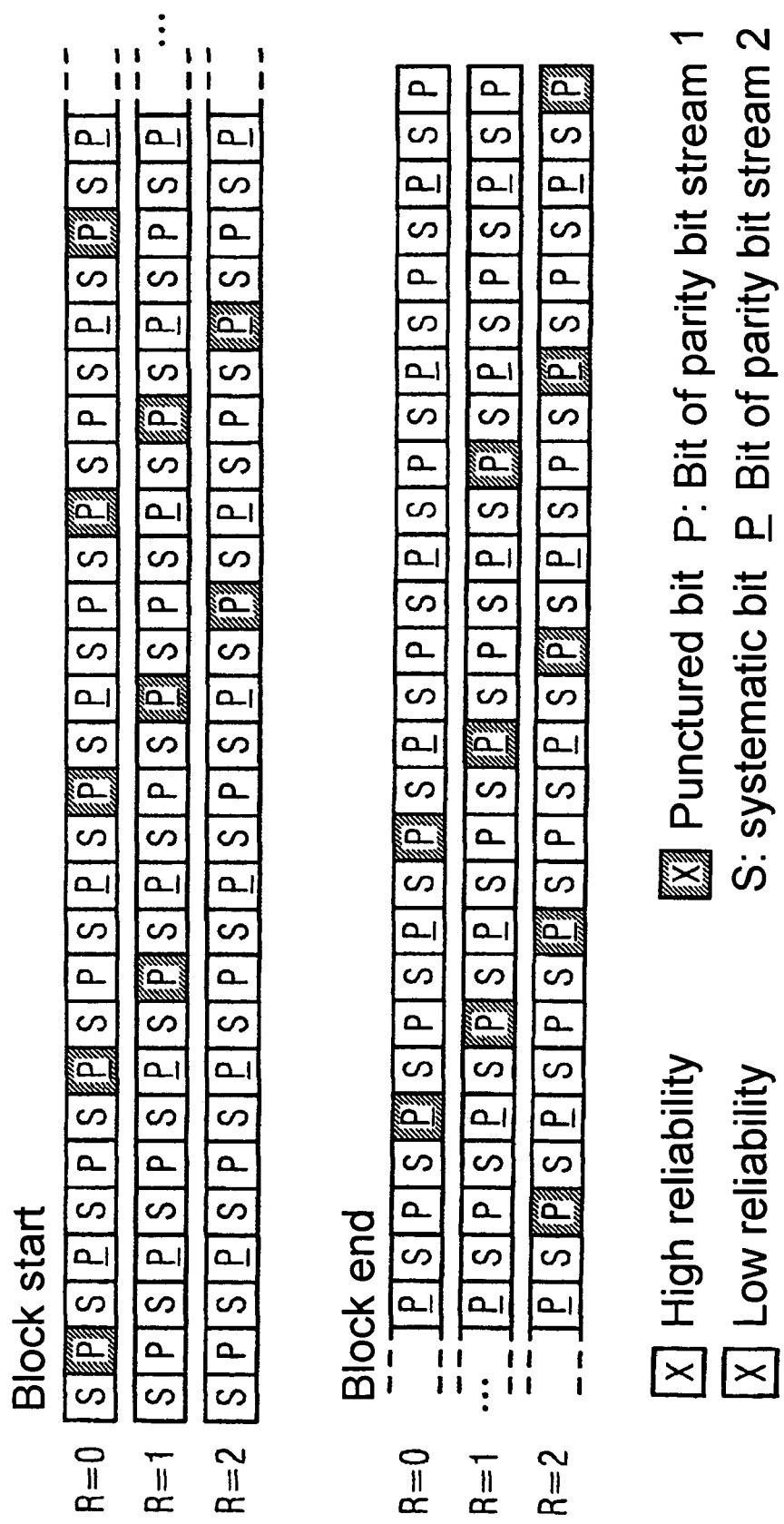

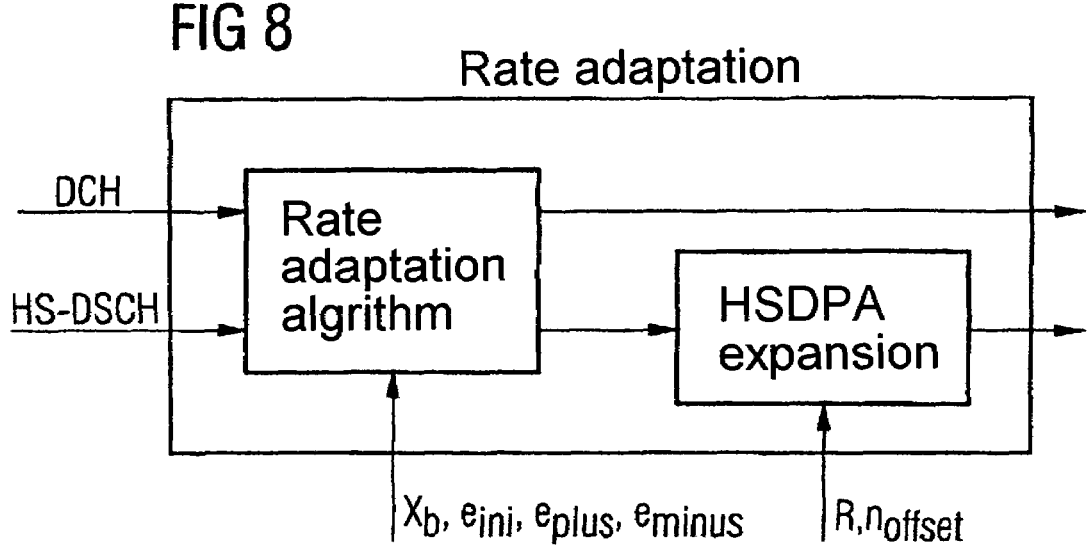
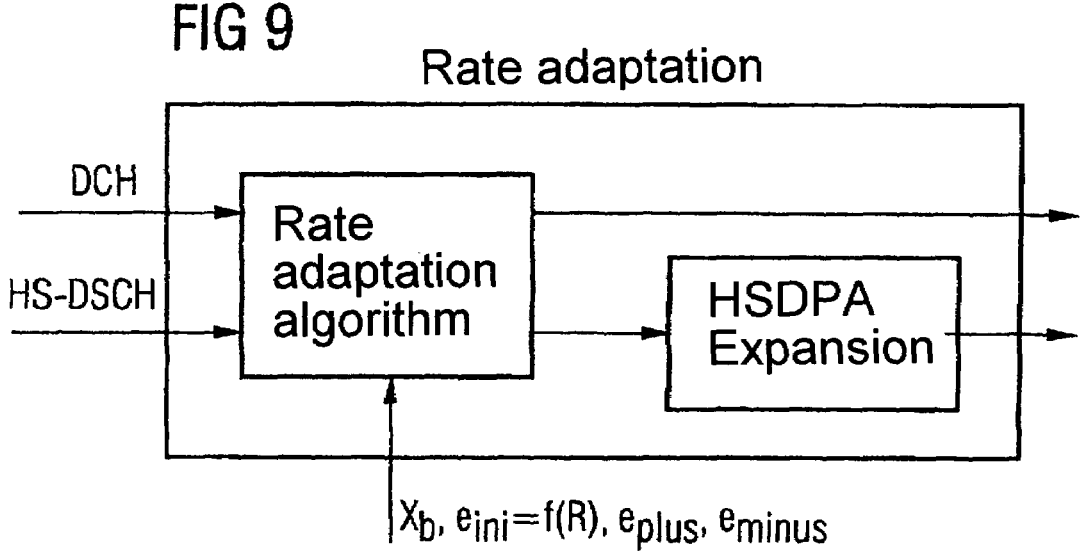

METHOD AND APPARATUS FOR TRANSFERRING DATA ACCORDING TO AN ARQ METHOD

BACKGROUND OF THE INVENTION

The present invention relates to a method and an appropriately equipped apparatus for transferring data according to an ARQ method, especially a hybrid ARQ method in a communication system; in particular, a mobile radio system.

Especially in conjunction with a mobile radio system, packet-access methods or packet-oriented data connections are proposed as the incoming message types often have very high burst factors so that there are only brief periods of activity interrupted by long periods of inactivity. In this case, packet-oriented data connections can be considerably more efficient when compared with other data transfer methods where there is a continuous stream of data, since in data transfer methods with a continuous data stream a resource (e.g., a carrier frequency or a time slot), is assigned for the entire communication process (i.e., the resource remains tied up even if there is temporarily no data transfer), with the result that the resource is not available for other network users. This results in non-optimum use of the limited frequency spectrum for mobile radio systems.

Future mobile radio systems such as those according to the UMTS mobile radio standard (Universal Mobile Telecommunications System), will offer a number of services in which multi-media applications will become increasingly significant in addition to pure voice transmission. The associated number of services with different transfer rates requires a very flexible access protocol on the radio interface of future mobile radio systems. Packet-oriented data transfer methods have proved to be suitable here.

In conjunction with UMTS mobile radio systems, an ARQ method (Automatic Repeat Request) was proposed for packet-oriented data connections. In this method, the data packets sent from a sender to a receiver are checked for quality after decoding on the receiver side. If a received data packet is errored, the receiver requests a new transfer of this data packet from the sender; i.e., a retransmission data packet is sent from the sender to the receiver that is either identical or partially identical to the data packet sent and the errored data packet received. Depending on whether the retransmission packet contains the same or less data than the original data packet, the retransmission is described as either complete or partial. This ARQ method proposed for the UMTS mobile radio standard, also known as a hybrid ARQ type I method, is proposed not only for transferring data but also for transferring header information in a data packet whereby the header information can contain information coded for error checking such as CRC bits (Cyclic Redundancy Check) and for error correction (known as Forward Error Correction, FEC).

According to the current UMTS standard, the proposal is to transfer the bits of the individual data packets or retransmission data packets after the channel has been appropriately coded using QAM modulation (Quadrature Amplitude Modulation). The individual bits are mapped using a method known as "gray mapping" to appropriate QAM symbols that create a two-dimensional symbol field. The problem with the proposed QAM modulation with an alphabet set that encompasses more than four QAM symbols is that the reliability of the bits to be transferred between the high-value bits and the low-value bits varies considerably. This is particularly disadvantageous with regard to channel coding since the turbo coders preferably used demand a high bit reliability to achieve a sufficiently high performance. With the hybrid ARQ type I method described, in which the retransmission data packet is identical to the original data packet, the variation in the bit reliability already described means that certain bits of the data packets and the retransmission data packets are found in the same position in the QAM symbol field. This reduces the overall performance of the data transfer and leads to premature restriction on the data throughput rate.

To resolve this problem, a method is proposed whereby those bits which occur in the same position in the original data packet and in the retransmission packet are assigned different QAM symbols in the QAM symbol field through dynamic rearrangement of the gray mapping.

This is described in more detail below with reference to FIGS. 4A-4D. FIG. 4A shows the signaling constellation or QAM symbol field for a 16-QAM modulation. Bits i1 and i2, and q1 and q2 are mapped to an appropriate QAM symbol 26 in the two-dimensional QAM symbol field 25 in the order i1 q1 i2 q2. The possible columns or rows of QAM symbols 26 for each of the bits i1, i2, q1, q2 in the two-dimensional QAM symbol field 25 are each marked using appropriate lines. So, for example, bit i1="1" can only be mapped to the first two columns of the QAM symbol field. Due to the gray mapping, the reliability of the higher value bit i1 is greater than the lower value bit i2. Furthermore, the bit reliability of the bit i2 varies depending on the QAM symbol 26 that is transferred; i.e., depending on whether the relevant QAM symbol 26 is assigned to the outside left or outside right column of the QAM symbol field 25. The same applies to bits q1 and q2, as the mapping of bits q1 and q2 is equivalent to the mapping of bits i1 and i2 (albeit orthogonal).

According to the conventional method described with reference to FIGS. 4A-4D, it is proposed to use a gray mapping for retransmission data packets that is distinct from the gray mapping for the original data packet; i.e., gray mapping (for example, as depicted in FIG. 4B) can be used for an initial retransmission data packet, while for a second retransmission data packet, gray mapping as shown in FIG. 4C, and for a third retransmission data packet, gray mapping as shown in FIG. 4D, can be used. When comparing the representations in FIGS. 4A-4D, it is clear that the same bit combination $i_1$ $q_1$ $i_2$ $q_2$ is always assigned different QAM symbols 26; i.e., different points in the two-dimensional QAM symbol field 25. This dynamic variation of the gray mapping can be extended such that a specified number of retransmissions of each bit i1, $i_2$, $q_1$ and $q_2$ can be transferred with very good, good or poor reliability to a point in the QAM symbol field 25 whereby this method can be optimized for a different number of retransmissions.

It is clear from FIGS. 4A-4D that this method is relatively complicated as the gray mapping has to be changed for each retransmission data packet.

An object of the present invention, therefore, is to propose a method and an appropriately equipped apparatus to transfer data according to an ARQ method to resolve the problem described above; i.e., to achieve a reliable data transfer with a high data throughput rate in the simplest manner.

SUMMARY OF THE INVENTION

According to the present invention, it is proposed that different rate adaptation patterns (i.e., different puncturing or repetition patterns), will be used on the individual bits of the original data packet and the individual retransmission data packets so that the appropriate bits are in different places in the relevant packet before QAM modulation and can, therefore, be assigned different points or QAM symbols in the symbol field without altering the gray mapping. This evenly distributes the reliability of the bits to be transferred between the data packet and the subsequent retransmission data packet so that high performance channel coding (for example, using turbo coding), can take place so that overall a sufficiently high performance is achieved for transferring information and data while at the same time guaranteeing a high data throughput rate.

The present invention can be achieved, for example, using a conventional rate adaptation algorithm whereby an offset value used according to such a rate adaptation algorithm that primarily determines the rate adaptation pattern is varied between the original data packet and the individual retransmission data packets. By varying this offset value, a higher performance coding can be achieved than with conventional hybrid ARQ type I methods.

Preferably, the channel-coded bit flow can be divided into a number of parallel partial bit flows (known as bit separation), whereby independent rate adaptation patterns (i.e., independent puncturing or repetition of the bits), are applied to the individual partial bit flows so that once the bits of these partial bit flows have finally been combined (known as bit collection), the required rate adaptation can be achieved with the different offset value with regard to the original data packet and the individual retransmission data packets. Dividing the bit flow into a number of partial bit flows achieves a particularly high level of flexibility for the channel coding.

Since the relevant receiver of data packets or retransmission data packets processed in this way must know the offset value used and explicit transmission of this offset value can be disadvantageous, the offset value can, for example, be changed synchronously with the time slot number (time slot) and/or synchronously with the frame number (frame) so that the receiver can conclude the offset value used directly from the time slot or frame received.

With the bit separation described above which divides the bits into a number of partial parallel bit flows, the different parallel partial bit flows can be combined proportionally per data packet or retransmission data packet in the final bit collection. This is particularly advantageous when using bit repetition. The aforementioned offset value can be set for the original data packet and the individual retransmission data packets such that the shift in the resulting data adaptation patterns with respect to one another is at its maximum and/or as many of the corresponding bits as possible of the original data packet or the retransmission data packet in the final modulation can be mapped to different points in the two-dimensional symbol field.

The aforementioned method works best if the bits are mapped directly to the required modulation symbol field after rate adaptation. This is not normally the case though as there is often a process known as interleaving, in which the bits are temporally reordered between rate adaptation and modulation. With a random interleaver, neighboring bits would be randomly distributed to the respective points or symbols of the two-dimensional symbol field so that the shift by one bit achieved with the aforementioned variation of the offset value would also produce a random change in the points or symbols of the two-dimensional symbol field. This would not be ideal since at best the assignment would be changed such that a bit with relatively low reliability when the original data packet was transferred would be mapped to a position with higher reliability in the modulation symbol field (e.g., in the QAM symbol field) when a retransmission data packet is later transferred (and vice versa), whereas with a random replacement only a gain of approximately 50% of the maximum possible gain could be achieved.

For this reason, it is preferable to use a highly regular interleaver for interleaving, such as a block interleaver, whereby the number of columns to which the interleaver distributes the bits with subsequent replacement or permutation of columns, and the number of points or symbols with different weightings and levels of reliability in the symbol field used should be a prime number so that assignment is optimum.

When requesting several retransmission data packets, it is advantageous if the chosen rate adaptation pattern (i.e., the puncturing or repetition pattern), is applied from retransmission data packet to retransmission data packet.

Using the shift in rate adaptation pattern proposed as part of the present invention between the data packet sent originally and the subsequent retransmission data packet or packets, the same code rate is retained, but the transfer quality and the bit error rate can be improved.

In general, compared with the method described in the introduction and known from the prior art, the method according to the present invention is much less complex whereby, in particular, no new stages need to be implemented in the method to achieve the present invention.

The present invention will now be described in more detail below with reference to the accompanying drawings using preferred embodiments for transferring packet-oriented data in a mobile radio system whereby the present invention is, of course, not restricted to mobile radio systems but can be used in all types of communication systems in which an ARQ method is used for transferring data.

BRIEF DESCRIPTION OF THE FIGURES

FIG. 6 shows a graphical representation of a rate adaptation mode.

FIG. 7 shows a graphical representation of a rate adaptation mode.

FIG. 8 shows a simplified block diagram of a rate adaptation.

FIG. 9 shows a simplified block diagram of a rate adaptation.

DETAILED DESCRIPTION OF THE INVENTION

Figures 2, 3:
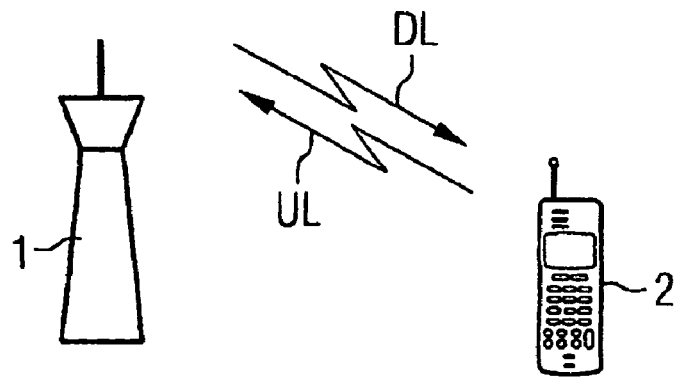
FIG. 2 shows the communication in a mobile radio system.
FIG. 3 shows a rate adaptation algorithm that can be used as part of the present invention for rate adaptation.

As already explained, it is assumed that packet-oriented data is to be transferred in a mobile radio system such as that shown schematically in FIG. 2 with the aid of the present invention. FIG. 2 shows, by way of example, the communication between a base station 1 and a mobile station 2 in a mobile radio system; e.g., a UMTS mobile radio system. Information is transferred from the base station 1 to the mobile station 2 via a "downlink" channel DL while information from the mobile station 2 is transferred to the base station 1 using the "uplink" channel UL.

The present invention will now be described in detail using the example of transferring packet-oriented data from the base station 1 to a mobile station 2 (i.e., using transferring packet-oriented data via the "downlink" channel), although the present invention can be applied analogously to transferring data via the "uplink" channel. Furthermore, the present invention will be described using the signal processing measures in the sender whereby it should be noted that to evaluate the data processed in this way on the sender side, in the receiver the signal should be processed in reverse order so that the present invention concerns not only the sender side but also the receiver side.

Figure 1:
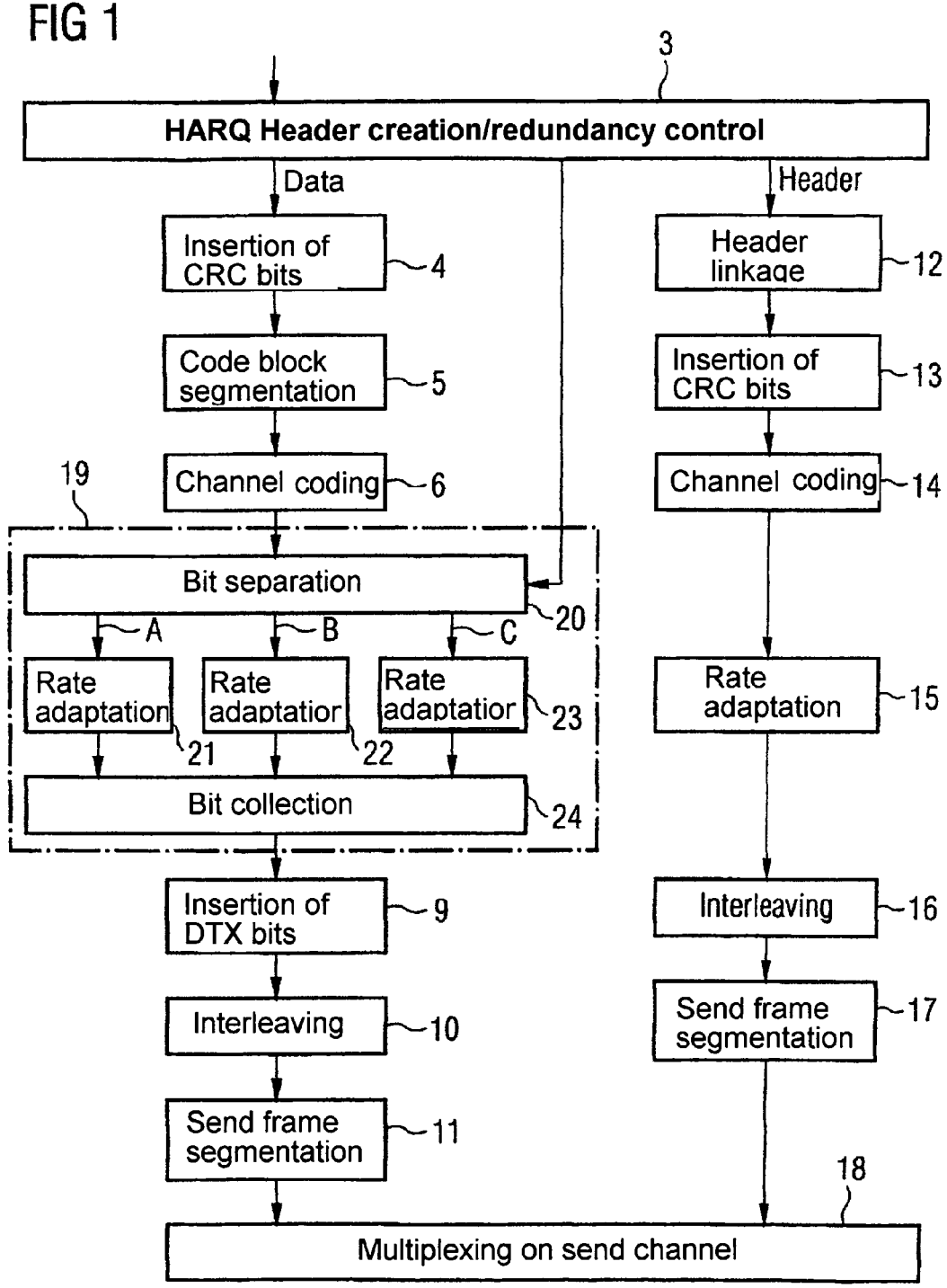
FIG. 1 shows the signal processing according to a packet-oriented ARQ method in the present invention.

In FIG. 1, the signal processing for the data and header information in the data packets is carried out by a hybrid ARQ method according to the present invention.

On the header side, the header information generated by function block 3 is routed to function block 12 that ensures that all the headers from all the data packets that should be sent in one radio packet are combined in a single header (known as "header concatenation"). Function block 13 adds the resulting header information CRC bits for header recognition. Function block 14 then codes the channels and the rate from the resulting bit flow is adapted by function block 15. Interleaver 16 causes any symbols or bits routed to it to be reordered in a particular way and temporally spaced. The data blocks that are output by interleaver 16 are assigned by function block 17 to the individual send or radio frames (known as "radio frame segmentation").

On the data side, function block 4 adds CRC bits. Function block 5 splits the data fed to channel coder 6 such that channel coder 6 can always carry out coding restricted to a certain number of bits.

The channel coding carried out by channel coder 6 adds redundant information to the data to be sent. As such, several data packets sent consecutively have bits with the same information origin.

The bits that are output from channel coder 6 are routed to function block 19 that sets the bit rate for the bit flow by removing or leaving out individual bits (known as puncturing) or repeating individual bits (known as repetition). DTX bits (Discontinuous Transmission) can be added to the data flow later by function block 9. Furthermore, function blocks 10 and 11 on the data side have the same functions as function blocks 16 and 17 on the header side.

The bits that are output on the data and header side are then each mapped or multiplexed by function block 18 to the available physical transmission or send channels (known as "multiplexing") and with the aid of suitable modulation, such as QAM modulation, are transferred to the receiver.

With the hybrid ARQ type I method, in the event of errored receipt or errored decoding of a data packet by the receiver, a retransmission data packet is requested which is completely or partially identical to the previously sent and errored data packet. Depending on whether the retransmission packet contains the same or less data than the original data packet, the retransmission is either complete or partial. The data packet and the retransmission data packet have at least some bits with the same information origin. Through common evaluation of the sent data packet and the requested retransmission data packet, the receiver can therefore re-obtain the originally sent information in better quality.

The present invention primarily concerns function section 19 shown in FIG. 1. This function section 19 encompasses function block 20 which, depending on a control by function block 3, divides the bits that are output from the upstream channel coder 6 into at least two parallel partial bit flows that are separately subjected to rate adaptation; i.e., independently from one another. FIG. 1 shows three partial bit flows A-C whereby for each partial bit flow there is a function block 21-23 to adapt the rates; i.e., to puncture or repeat individual bits. In this way, a number of differently coded parallel bit flows are created which are routed to a further function block 24. This further function block 24 is tasked with collecting the individual bits of the parallel bits flows in the same order as that used by function block 20 for bit separation; i.e., for division into individual parallel partial bit flows (bit collection). This ensures that the order of the remaining bits after the rate adaptation is unaltered.

As previously explained, the rates for the individual partial bit flows A-C can be adapted separately by the function blocks 21-23. In particular, the bits of one or more partial bit flows need not be punctured or repeated. All in all, the rate adaptation for the partial bit flows A-C should be selected such that a desired rate adaptation pattern can be used by all of function section 19 on the channel-coded bit flow output by function block 6 for each data packet or retransmission data packet. With the embodiment shown in FIG. 1 of function section 19 with a number of parallel rate adaptations, a high level of flexibility can be achieved for the coding.

Function section 19 is designed such that, as a function of control by function block 3, it applies a different rate adaptation pattern to the bits of a retransmission data packet than to the bits of the data packet originally sent. That is, function block 19 is informed by function block 3 whether a retransmission data packet has been requested by the receiver whereby function section 19 in this case selects or sets the rate adaptation pattern for the individual function blocks 21-23 so that overall the bits of the retransmission data packet are processed with a different rate adaptation pattern from then the bits of the data packet originally sent.

The overall rate adaptation employed by function section 19 can be carried out according to the rate adaptation algorithm shown in FIG. 3 that is known from the prior art. The rate-matching algorithm contained in the UMTS standard is described in [25. 212]. As key parameters it uses:

$X_b$: Number of coded bits per packet in the bit flow b $e_{ini}$: Initial error value ($N_{TTI}/3$)

$e_{plus}$: Increment for the error value during puncturing/repetition $e_{minus}$: Decrement for the error value per output bit In the existing standard (e.g., for turbo-coded transport channels for the downlink with fixed bit positions (Chapter 4. 2. 7. 2. 1 in [25. 212])) these parameters are determined as follows for puncturing:

$$e_{ini}=N_{max}. \quad (5.1)$$

Where $N_{max}$ is the maximum number of bits per parity bit flow before the rate matching determined across all transport formats and transport channels. The increments and decrements of the error value are calculated as follows:

$$e_{plus}=a \times N_{max}, \; e_{minus}=a \times |\Delta N_i^b|, \quad (5.2)$$

where a=2 applies to the first parity bit flow and a=1 for the second parity bit flow. $|\Delta N_i^b|$ is the number of punctured bits per bit flow b for the transport channel i.

In particular, a rate adaptation parameter $e_{ini}$ is used which indicates an offset value valid for the rate adaptation carried out with regard to the rate adaptation pattern used. At the start of the rate adaptation algorithm shown in FIG. 3, an error variable e is initialized with the offset value $e_{ini}$ whereby the error e for puncturing is, for example, the ratio between the actual puncturing rate and the required puncturing rate.

The index m of the current bit to be processed is set to the first bit (i.e., is set to the value 1) and an auxiliary error parameter $e_{plus}$ is initialized.

For all bits of data packet number i to be processed, a loop is then run, with the number of bits of the data packet designated by $X_i$.

Within this loop the error e is first updated using a further auxiliary error parameter $e_{minus}$ and checked to determine whether the resulting error e is greater than zero to determine whether the relevant bit should be punctured or not. If the aforementioned condition is met, the relevant bit is set to an auxiliary value δ and therefore punctured; i.e., blocked for the subsequent data transfer.

If, however, the aforementioned condition is not met, the relevant bit is selected for the data transfer and the error e is recalculated using the first auxiliary error parameter $e_{plus}$.

To conclude the data adaptation or puncturing algorithm, the bit index m is incremented and, hence, the next bit is selected for processing as described above.

The rate adaptation pattern used on the bit of a data packet or retransmission data packet can be significantly influenced by the choice of offset value $e_{ini}$. By varying this offset value $e_{ini}$, a different rate adaptation pattern can be used on a retransmission data packet than on the data packet originally sent, whereby the rate adaptation can be used particularly with reference to the parity bits of the individual partial bit flows A-C (compare FIG. 1).

Since the receiver of the data packets or retransmission data packets processed in this way must know the rate adaptation pattern or offset value $e_{ini}$ used, the offset value $e_{ini}$ can, for example, be varied synchronously with the time slot number (time slot) and/or synchronously with the frame number (frame) so that the receiver can conclude the offset value $e_{ini}$ used directly from the number of the time slot or frame received and hence conclude the rate adaptation pattern used. A redundant version is therefore defined by an $e_{ini}$.

Figure 4:
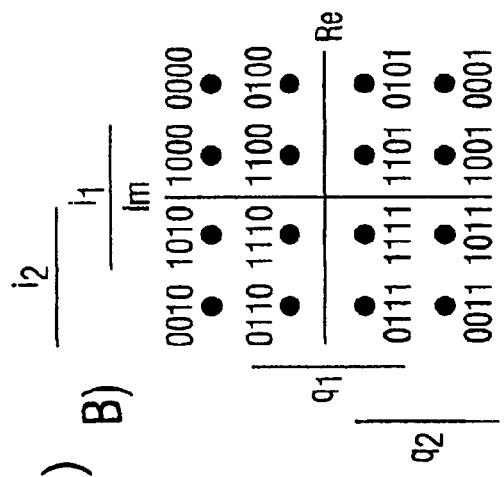
FIGS. 4A-4D show the mapping of bits from a data packet sent originally or from retransmission data packets to QAM symbols according to the prior art.
Figure 4:
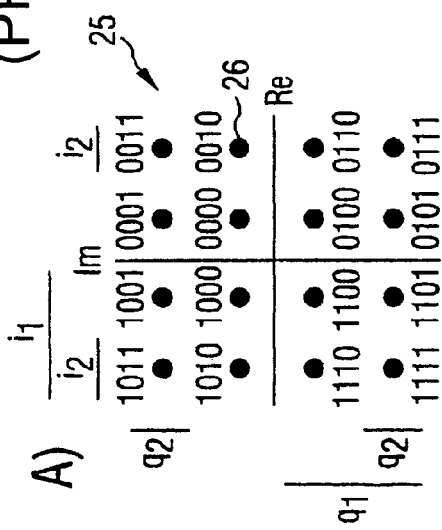
Figure 4:
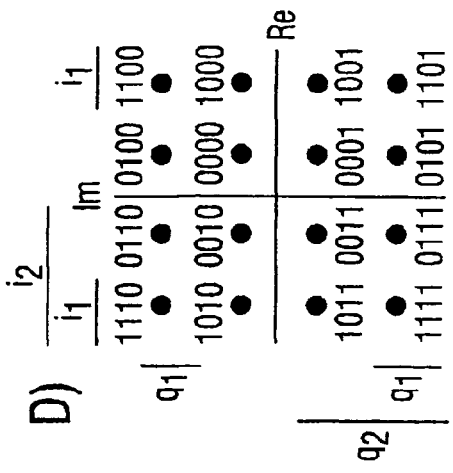
Figure 4:
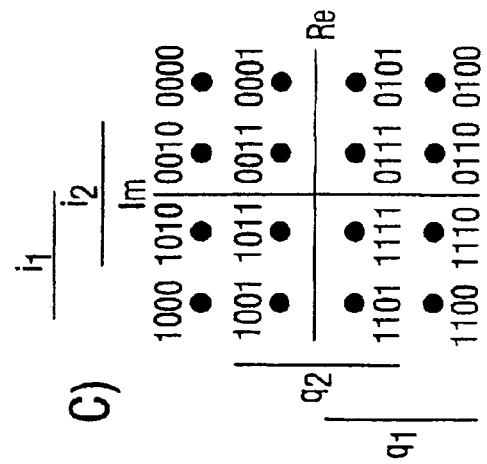

The offset value $e_{ini}$ is beneficially selected for the data packet originally sent and the retransmission data packet so that the shift in the resulting data adaptation patterns with respect to one another is at its maximum; i.e., as great as possible. Furthermore, the offset value $e_{ini}$ is beneficially selected for the data packet originally sent and the retransmission data packet so that as many of the corresponding bits as possible of both packets can be mapped in the final modulation (in particular, the QAM modulation), to different points in the two-dimensional symbol field (compare, for example, the diagrams in FIG. 4).

This can be achieved, for example, by setting the offset value $e_{ini}$ for the original data packet to $e_{ini}=0$ and for the subsequent retransmission data packet to $e_{ini}=e_{plus}$. In the first instance, the first bit is punctured while in the second instance, the last bit of the retransmission data packet is punctured so that the position of all the in-between bits are also shifted by one place. This ensures (with a suitable design of the subsequent interleaver 10 and the subsequent gray mapping to achieve an appropriate modulation) that a bit for both transfers is mapped to different points in the two-dimensional symbol field which is advantageous for an even distribution of the reliability of the bits transferred. A further advantage is that the retransmission data packet also contains new information and not just the bits of the original data packet so that there is also a gain here.

The assignment of the offset value $e_{ini}$ can be coordinated for the individual partial bit flows A-C so that, for example, depending on the algorithm selected, $e_{ini}$ for the individual partial bit flows A-C can be alternatively set to zero or $e_{plus}$.

When transferring several retransmission data packets, the chosen rate adaptation pattern (i.e., the chosen puncturing or repetition pattern), should be beneficially applied from retransmission data packet to retransmission data packet. For the data packet originally sent and the first retransmission data packet, the offset value $e_{ini}$ can, as described above, be set to zero or $e_{plus}$, whereby for the subsequent retransmission different values should be used. So, for example, for the $k^{th}$ iteration, the value $k \cdot e_{minus}$ can be used for the offset value $e_{ini}$ which shifts the rate adaptation pattern by k bits. Similarly, for the retransmission data packet 2k, $k-e_{minus}$ can be used as the offset value $e_{ini}$ and for the retransmission data packet number 2k+1, $k-e_{minus} + e_{plus}$ can be used as the offset value $e_{ini}$. This ensures that all the bits, (with the exception of the bits directly at the start before the first puncturing/repetition and the bits directly at the end after the last puncturing/repetition), for consecutive retransmission data packets have different allocations to the individual points or QAM symbols in the QAM symbol field whereby different points can also be punctured or repeated.

Depending on the code rate, different numbers of parity bits are available per channel coding process. As such, the number of possible redundant versions (which are formed entirely of parity bits that have not yet been sent and therefore represent the maximum IR gain) is also dependent on the code rate. A further embodiment therefore provides for the calculation of this maximum number of redundant versions $N_{pat}$ in the receiver without additional signaling. The redundant version $R=(0, 1, 2, \ldots, N_{pat}-1)$ that is used in the current packet is calculated, for example, from the system frame number (SFN) using $$R = SFN \bmod N_{pat}.$$

If the packet number and the frame limit are not identical, the packet or slot number can be used to calculate the redundant version.

If the redundant version R is calculated using the last specified equation, there is also an option to take measures in the sender which optimize the sequence of the various redundant versions for each block. An additional decision criterion is therefore added to the scheduling algorithm that determined which user is served in the following transmission interval. This criterion calculates for all users for whom current data is available the next resulting redundant version R in the transmission interval. In addition to an evaluation of the usual criteria (such as signal-to-noise ratio and required quality of service), preference will be given to the user for whom the best addition to the previously transferred redundancy occurs in the interval in question. This maximizes the probability that decoding will successfully take place after the transmission of this block and, hence, increases the capacity of the communication system. This means that despite the calculation of the redundant version from the SFN, the IR gain can be optimized without requiring explicit signaling. For example, the scheduling algorithm with lower priority sends packets to those mobile stations in which in the current interval a retransmission data packet with a redundant version would be sent which they have already received in an earlier packet as then there is no IR gain.

For function block 10 shown in FIG. 1, a highly regular interleaver should be used instead of a ransom interleaver. So, for example, a block interleaver could be used for function block 10. If the interleaver used for function block 10 is a highly regular interleaver and if the number of columns to which the interleaver distributes the bits routed to it and the number of the points with different weightings in the two-dimensional QAM symbol field or generally the number of differently weighted modulation points is a prime number, then the assignment is optimum. The interleaver proposed by the current UMTS standard is a block interleaver with additional column replacement which distributes neighboring bits to columns that are separated by multiples of "5" and then replaces the columns. When using 30 columns, the column permutation is, for example, as follows: Column number 0, 20, 10, 5, 15, 25, 3, 13, 23, 8 . . . . Since the value "5" is a prime number with the number of the different bits, for example, for 16-QAM modulation (namely two bits) and 64-QAM modulation (namely three bits), this combination, for example, produces good scrambling or good mapping to the appropriate modulation points.

According to a further preferred embodiment, the bit rate adaptation pattern selected for the data packet originally sent, or for the retransmission data packet or for the retransmission data packets, can be selected such that the individual bit rate adaptation patterns only differ at the start and at the end while remaining identical in the middle section whereby the puncturing or repetition rates of the individual bit rate adaptation patterns are identical. This is particularly suitable for high data rates since the memory overhead in the receiver compared with the previously described embodiment, in which the offset value is varied, can be reduced by the puncturing or repetition rate used. The performance gain achieved compared with conventional procedures lies mainly in the even distribution of the transferred information to the bits with different levels of protection or reliability to the QAM symbols. The gain from the new information added to the retransmission data packet that cannot be exploited in this embodiment is balanced by the advantage of the reduced memory overhead.

According to a further embodiment of the principle already described, a puncturing/repetition pattern, hereinafter known as a basic pattern, can be defined via which n more bits are punctured or repeated than originally envisaged. Based on this basic pattern, n different repetition patterns are then derived by not performing the first j puncturings or repetitions at the start of the basic pattern and omitting the last n-j puncturings or repetitions at the end. j can equal 0, 1, . . . n. As a result, the basic pattern is cut at the start and at the end at a total of n positions; there are n possible options which all lead to a different allocation of the in-between bits to the different bits of the QAM symbols. For the data and retransmission data packets, a different number n of puncturings or repetitions is omitted at the start and at the end, with the total number of puncturings and repetitions remaining constant.

The following describes further embodiments of the present invention which alone and in any combination with the present invention and its features as already described are covered by the present invention and which also show how the default for the various parameters of the rate matching (rate adaptation) algorithm must be controlled to produce rate matching patterns that suitably combine averaging of the bit reliabilities and the coding gain through IR (incremental redundancy); i.e., the coding gain that results from repeated transfer of a data packet to which different rate matching patterns are applied. With specific control it is possible to generate different modes which have different focuses in terms of IR coding gain and gain through averaging the bit reliabilities; for example, a mode known as "quasi-chase-combining mode" which achieves an ideal gain by averaging the bit reliabilities using the new concept of a basic pattern with minimal additional memory overhead, and the "combined IR and symbol mapping modes" in which the IR gain increases with increasing puncturing rates and which enable the optimum working point to be set in terms of the IR gain compared with gain from averaging the bit reliabilities by setting suitable defaults for the rate matching parameters for each retransmission data packet.

Figure 5:
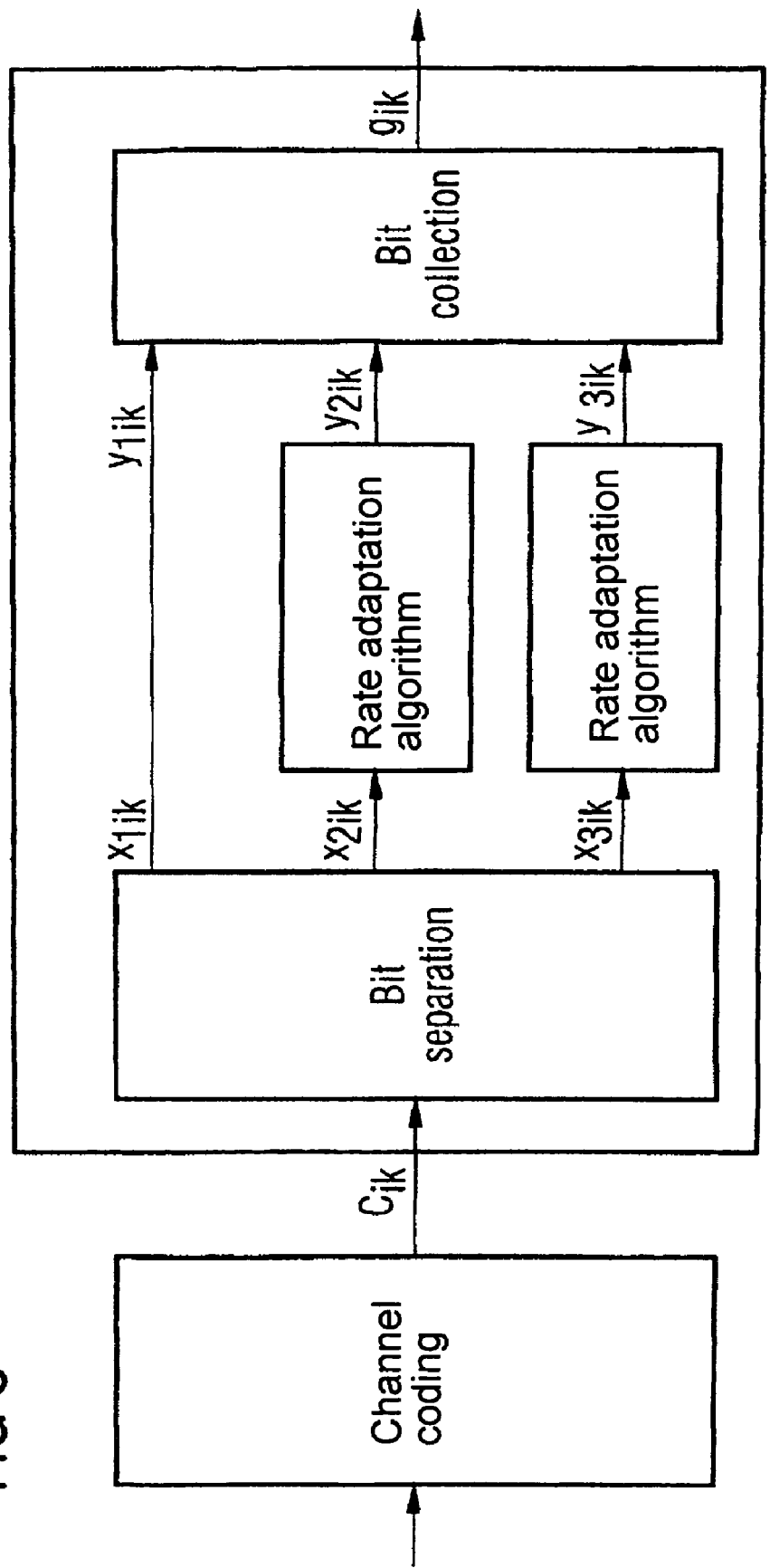
FIG. 5 shows a simplified block diagram of a rate adaptation.

FIG. 5 shows, by way of example, the signal processing sequence for HSDPA (High Speed Downlink Packet Access), a further development of the UMTS standard that enables packet-switched connections with higher data rates. It is important here that bit separation, which separates systematic and parity bits of the turbo code, is carried out after channel coding. Rate matching is only carried out in the p parity bit flows (here, 2 flows) and such that for each approximately $N_p/p$ bits are punctured or repeated (p=2 in FIG. 5).

Alternatively, especially in the case of repetition, there can be a rate matching block for the systematic bits or bit separation can be avoided or there can be a rate matching block for the entire bit flow.

In a symbol of the 16-QAM there are two well protected bits (marked in the following with H for high reliability) and two poorly protected bits (L for low reliability); i.e., k=2. This bit-to-symbol allocation is represented by {H, H, L, L}. If in the various redundant versions the difference of the previously punctured/repeated bits $\Delta B=k\times(2\times m-1)$, where m is an integer, then there is a reversal of the allocation of the current bits to the other bit reliability: {L, L, H, H}. If for example, a bit is sent in the first transfer to an L bit, then in the second transfer it is sent to an H bit. For $\Delta B=1\times(2\times m-1)$ this reversal takes place for 50% of the bits anyway.

A 64-QAM symbol includes two bits (i.e., k=2 here as well) with higher, medium and lower reliability: {H, H, M, M, L, L}. The extra bit class M is added for medium reliability. If $\Delta B=k\times(3\times m-2)$ for the current bits then the allocation is cyclically replaced by one bit class; i.e., {L, L, H, H, M, M}; for $\Delta B=k\times(3\times m-1)$ this produces {M, M, L, L, H, H}. An ideal averaging of the bit reliabilities can, therefore, be achieved after three packet transfers. There is, however, already a partial averaging effect after two transfers.

A suitable parameter k can also be found for modulation types with different number of bits per bit class. For the 8-PSK for each symbol there is, for example, two well protected bits and 1 poorly protected bit: {H, H, L}. If k=1 is selected, then for $\Delta B=k\times(3\times m-2)$ the allocation is {L, H, H}, for $\Delta B=k\times(3\times m-1)$ the allocation is {H, L, L}; i.e., in both cases the bit reliability is averaged after just two transfers.

If other processes are used to allocate the individual bits to the symbol points, then the afore-mentioned considerations can be easily adapted. If, for example, for 16-QAM the allocation is changed such that each symbol gives the sequence {H, L, H, L}, then an ideal reversal of the bit reliabilities for $\Delta B=k\times(2\times m-1)$ is given where k=1.

For the "quasi-chase-combining mode," the IR gain is relinquished where possible in favor of minimizing the memory overhead but maximum gain is achieved through averaging the bit reliability. A basic pattern is generated which is determined in the conventional manner, but instead of the number of punctured or repeated bits Np required originally, with the increased number $N_{p,IR}=N_p+k\times(N_{pat}-1)$, where $N_{pat}$ is the number of different redundant versions and k is the number of consecutive bits f equal reliability per symbol. In this mode, $N_{pat}$ need not be determined using the code rate and can be fixed in advance (e.g., $N_{pat}=2$ to minimize the memory overhead). For each transmission of a packet, Np bits are selected from this basic pattern that are actually punctured/repeated, whereby during the selection care can be taken that the number of previously puncture/ repeated bits in the various retransmission data packets is different from k (see also later). This ensures that after the initial retransmission, the symbol mapping of the bits is changed such that in the majority of the packet there is a balance of bit reliability and, therefore, a gain is achieved. The actual puncturing/repetition pattern is therefore determined solely from the retransmission number r determined in the mobile station and the known rate matching parameters. The total memory overhead only increases by $k \times (N_{pat}-1)$ bits. A further advantage is that by using a basic pattern, the superimposition of the various transmissions of a packet in the receiver (known as soft combining) can be simply and efficiently achieved.

Generally, this process can be used to generate combined IR and symbol mapping methods whose IR gain increases with increasing puncturing rate $N_p$. This is particularly beneficial since the unavoidable performance loss in the decoding is automatically countered by puncturing. Other parity bits are punctured in the retransmission packets. This is achieved in that, firstly, the relevant redundant version is generated from the basic pattern as stated above, based on the retransmission number R generated in the mobile station and then the puncturing/repetition pattern is cyclically replaced for each parity bit flow by $n_{offset}$ bits. With increasing $n_{offset}$, the punctured/repeated bits in the different redundant versions are increasingly shifted in relation to one another so that the achievable gain through incremental redundancy is increased. At the same time, however, there is a decrease in the percentage of bits which are transferred to another bit reliability level compared with the preceding redundant version; i.e., the gain from averaging the bit reliabilities decreases. With the aid of simulations, it is possible to determine an optimum working point for the system and to define it based on the $n_{offset}$ parameter so that additional signaling is not necessary. It is, however, conceivable to change the parameter $n_{offset}$ semi-statically or dynamically to be able to switch between the different modes (the "quasi-chase-combining mode" corresponds to a "combined IR and symbol mapping method" where $n_{offset}=0$). The total memory overhead increases for $n_{offset} \neq 0$ by $N_p \times (N_{pat}-1)$.

Functionally, this can be implemented by using basic patterns by re-using the conventional rate matching algorithm that is required anyway and adding an HSDPA extension as shown in FIG. 8. In UMTS, a further subscriber connection (DSCH, dedicated channel) is always maintained (e.g., parallel to an HSDPA connection (shown as HS-DSCH)) so that the conventional rate matching algorithm is required in the receiver. Thanks to the modular construction, as shown in FIG. 8, the function blocks that are required in the receiver anyway can be efficiently re-used.

The present invention described here uses the same algorithm to calculate the basic pattern but with a different default for the parameter $e_{minus}$:

$$e_{minus} = a \cdot |\Delta N_i^b - N_{pat} - 1|, \quad (5.3)$$

where $N_{pat}$ is the number of different rate matching patterns.

The number of redundant versions used can be fixed, but is ideally calculated based on the code rate such that as many redundant versions are generated as are necessary to be able to send all the existing parity bits at least once. The number of redundant versions is obtained by rounding up the quotient of the existing parity bits to sent parity bits per packet. For low code rates, this criterion produces very few redundant versions. This number does ensure that each parity bit can be sent at least once, but for the individual bits does not generate a good average in terms of the number of uses in the redundant versions. This can be countered by calculating the number of redundant versions from the quotient of the existing parity bits to the punctured parity bits per packet. It is then possible for each parity bit to be punctured approximately once and transferred approximately $N_{pat}-1$ times and, therefore, approximately the same number of transmissions is achieved for all bits as soon as all the redundant versions have been sent.

Practically, the number of redundant versions can be determined from the maximum of the criteria described above; e.g., $$N_{pat} = \max\left(\left\lceil \frac{N_{ges}}{N_{ges}-N_p} \right\rceil, \left\lceil \frac{N_{ges}}{N_p} \right\rceil\right) \quad (5.5)$$

For systematic codes, such as the turbo code used in UMTS, the number of redundant versions can be calculated as follows:

$$N_{pat} = \max\left(\left\lceil \frac{p \cdot X_b}{N_{ges}-X_b} \right\rceil, \left\lceil \frac{p \cdot X_b}{(p+1) \cdot X_b - N_{ges}} \right\rceil\right) \quad (5.5)$$

with $$X_b = N_{ges} \cdot R_c + N_{ov}. \quad (5.6)$$

Where $N_{ges}$ represents the total number of bits per block transferred, p the number of parity bit flows (e.g., p=2 in UMTS), R, the code rate and $N_{ov}$ all overhead bits; e.g., for error recognition (CRC) and terminating the channel coding.

In the case of repetitions (i.e., very low code rates), similar considerations apply. Here the number of redundant versions can be determined from the quotient of the total number of transferred bits divided by the number of repeated bits. Alternatively, the repetition rate can be converted to an equivalent puncturing rate. A repetition of 270% would, for example, correspond to a puncturing rate of 30%, since 30% of the bits cannot be repeated three times (but only twice), so they have a lower reliability. This is similar to a puncturing rate of 30% but in the case of puncturing the differences are greater. Using this equivalent puncturing rate, the number of redundant versions can then be calculated as described above.

After calculating the basic pattern, the rate matching patterns of the individual redundant versions R are calculated by transferring once and once only in the two parity bit flows the first ($R_{mod}$) and last ($N_{pac}-R_{mod}$) bit positions of those marked in the basic pattern as bits to be punctured/ repeated. The following applies:

$$R_{mod} = R \bmod N_{pat}. \quad (5.7)$$

The rate matching pattern resulting in the total bit flow and the effect on the bit allocation within the symbol are shown in FIG. 6 by way of example for 16-QAM, code Rate=1/2, puncturing and three different redundant versions.

The incoming bit flow contains a parity bit from parity bit flow 1 and 2 after each systematic bit. Starting from a basic pattern, FIG. 6 shows how puncturing in each parity bit flow starts and ends one bit later. The total bit flow as shown in FIG. 6 results after the bit collection. Apart from small areas at the start of the block and end of the block, there is optimum averaging of the bit reliabilities after the first repetition (R=1), the same bits (i.e., arranged under one another) were sent once with high reliability (no shading) and once with lower reliability (gray shading). The area in which this optimum averaging occurs is shown in FIG. 6 as the area between the two bold lines. For each transfer, only two additional bits of incremental redundancy are transferred. Since, generally, the number of bits to be punctured is greater than the number of redundant versions, the fact that the basic pattern is calculated based on an increased number of bits to be punctured has almost no effect on the regularity of the puncturing within the blocks; the influence of the small areas at the start and end of the block can, therefore, be ignored.

Using a basic pattern in the "quasi-chase mode" enables very efficient memory access when superimposing the various block transfers for soft combining. In this instance, the soft-combining memory can be implemented directly before the rate matching in the receiver so that the total memory overhead after all the transfer only corresponds to the number of transferred bits per block plus R×2.

A combined IR and symbol mapping mode can be achieved by performing cyclical replacement of the rate matching pattern by $n_{offset}$ bits in each parity bit flow. FIG. 7 shows the above example for $n_{offset}=1$. It is clear that in contrast to FIG. 6 there is no longer a large contiguous area as a result of averaging the bit reliabilities after the first repetition. This averaging only occurs for a small percentage of the bits and so the gain from this effect is reduced. However, in this mode other bits are punctured which each repetition so the number of punctured bits is added to the incremental redundancy and, hence, the IR gain compared with FIG. 6 is considerably increased. At the same time, the total memory overhead is increased to the number of bits transferred per block plus R×$N_p$ ($N_p$: number of punctured bits). These models apply analogously to repetitions.

A "combined IR and symbol mapping mode" alternatively can be achieved by changing the default of the initial value of the error variables once for each redundant version. This is achieved, for example, by setting the parameter a=1 for all parity bit flows in equation (5.2) and calculating $e_{ini}$ in each redundant version r using $$e_{ini}(r)=((e_{ini}(r-1)-e_{minus}-1) \bmod e_{plus})+1 \quad (5.8)$$

The mod function designates the remainder of the division and so in this case has the value range $\{0, 1, \ldots, e_{plus}-1\}$. The following applies to the initial value:

$$e_{ini}(0)=N_{max\_und} \ r=\{1, 2, \ldots, N_{pat}-1\}. \quad (5.9)$$

This means that as r increases the rate matching pattern is always shifted forward by one bit position. The mod function in equation (5.8) limits the maximum possible offset so that in each redundant version there is exactly the same number of puncturings and repetitions. This choice can ensure that different parity bits are transferred in the different redundant versions and hence the maximum IR gain can be achieved. Using this method, the achievable gain by averaging the bit reliabilities is large for high rates, for low code rates there is a benefit in this respect compared with a basic pattern. To maximize the gain from averaging the bit reliabilities for an implementation per $e_{ini}$ variation, the sequence of the redundant versions used must be optimized; e.g., by using 16-QAM for the first transfer r=0 and for the second r=$N_{pat}$-1.

This embodiment can also be combined with a variation of the initial value of the error variable $e_{ini}$ for each packet transfer. "Combined IR and symbol mapping modes" then arise in which the IR gain increases with increasing puncturing rates and which enable the optimum working point to be set in terms of the IR gain compared with gain from averaging the bit reliabilities by setting suitable defaults for the $e_{ini}$ for each retransmission data packet.

Furthermore, options are conceivable that work for a certain repetition number in "quasi-chase mode" and for another in "combined IR and symbol mapping mode." In all cases, all redundant versions can be decoded without any additional signaling overhead.

FIG. 9 shows an implementation wherein the parameter $e_{ini}$ is varied as a function of the current redundant version R.

Thanks to the modular construction, this method is possible for puncturing, repetition and a wide variety of transport formats. By suitably selecting the parameters (e.g., number of redundant versions, number of bit flows), it can be adapted to a variety of modulation and coding schemes.

Although the present invention has been described with reference to specific embodiments, those of skill in the art will recognize that changes may be made thereto without departing from the spirit and scope of the present invention as set forth in the hereafter appended claims.

REFERENCES

[25. 212] "Multiplexing and Channel Coding (FDD) (Release 1999)," Technical Specification 3GPP TS 25. 212

The invention claimed is:

1. A method for transferring data according to an ARQ method where data is transferred as data packets from a sender to a receiver, the method comprising the steps of:

transferring a data packet from the sender to the receiver;

transferring, after the transfer of the data packet and upon an appropriate request from the receiver, at least one retransmission data packet to the receiver from the sender;

subjecting bits to be transferred in the respective data packet and retransmission data packet to bit rate adaptation before being transferred from the sender to the receiver; and using different bit rate adaptation patterns for the respective data packet and retransmission data packet, wherein the bit rate adaptation is carried out with aid of a bit rate adaptation algorithm which punctures or repeats the bits in the respective data packet and retransmission data packet depending on a value of an appropriate rate adaptation pattern parameter ($e_{ini}$) for bit rate adaptation of the bits in the retransmission data packet being changed with respect to the bit rate adaptation of the data packet so that after bit rate adaptation, bits with a same information origin are transferred from the sender to the receiver in different positions in the respective data packet and retransmission data packet.

2. A method for transferring data as claimed in claim 1, wherein for bit rate adaptation, bits of a channel-coded bit flow are divided into a plurality of individual partial bit flows and the individual partial bit flows are each subjected to separate bit rate adaptation, and after the appropriate bit rate adaptation for the respective data packet and retransmission data packet, the bits of the individual partial bit flows are recombined.

3. A method for transferring data as claimed in claim 2, wherein after the appropriate bit rate adaptation, the bits of the individual partial bit flows are combined proportionally per the respective data packet and retransmission data packet.

4. A method for transferring data as claimed in claim 1, wherein the data transfer from the sender to the receiver is integrated in a frame and time slot structure, where the bit rate adaptation pattern is changed depending on at least one of a number of the time slot and a number of the frame in which the respective data packet and retransmission data packet is transferred.

5. A method for transferring data as claimed in claim 1, wherein the bit rate adaptation pattern used for the retransmission data packet is changed compared with the bit rate adaptation pattern used for the data packet such that when QAM modulation is performed on the bits to be transferred, the bits with identical information content with regard to the retransmission data packet are mapped to different points in a QAM symbol field than the bits in the data packet originally sent.

6. A method for transferring data as claimed in claim 1, the method further comprising the steps of:
  subjecting the bits to be transferred, after the bit rate adaptation, to an interleaving process wherein bits are distributed to a plurality of columns, and individual columns are replaced by other individual columns so that the bits are temporally reordered by the interleaving process; and
  subjecting the bits to be transferred to QAM modulation after the interleaving process, wherein a certain number of bits in a bit sequence after the interleaving process are mapped to a point in an appropriate QAM signal field where a number of columns that lie between two neighboring columns after the interleaving process and column replacement and the number of bits mapped by QAM modulation to a point in the QAM symbol field do not have a common divider.

7. A method for transferring data as claimed in claim 6, wherein a block interleaver is used in the interleaving process.

8. A method for transferring data as claimed in claim 7, wherein the bit rate adaptation algorithm selects bits to be punctured or repeated using an error variable (e), where the error variable (e) is initialized at a start of the rate adaptation algorithm with a value of the rate adaptation algorithm parameter ($e_{ini}$).

9. A method for transferring data as claimed in claim 8, wherein upon a request for a plurality of retransmission data packets from the receiver, a different bit rate adaptation pattern is used each time to adapt the bit rate of the bits of the individual retransmission data packets.

10. A method for transferring data as claimed in claim 9, wherein the rate adaptation parameter ($e_{ini}$) is set to zero for bit rate adaptation of the data packet originally set, is set to a value $e_{plus}$ for bit rate adaptation of a first retransmission data packet, and is set to a value k $e_{minus}$ for bit rate adaptation for each additional retransmission data packet, where k represents a number of the retransmission data packet, $e_{plus}$, is a first error parameter and $e_{minus}$ is a second error parameter which are used in the rate adaptation algorithm to update the error variable (e).

11. A method for transferring data as claimed in claim 9, wherein the rate adaptation parameter ($e_{ini}$) is set to zero for bit rate adaptation of the data packet originally set, is set to a value $e_{plus}$ for bit rate adaptation of a first retransmission data packet and for bit rate adaptation of each subsequent retransmission data packet with a number 2k to a value k $e_{minus}$ or each subsequent retransmission data packet with a number 2k+1 to a value $k-e_{minus}+e_{plus}$, with k=1, 2, 3 . . . , where $e_{plus}$ represents a first error parameter and $e_{minus}$ represents a second error parameter which are used in the rate adaptation algorithm to update the error variable (e).

12. A method for transferring data as claimed in claim 1, wherein the bit rate adaptation pattern used for the data packet and the bit rate adaptation pattern used for at least one retransmission data packet only differ in a start section and an end section, wherein in a middle section the bit rate adaptation pattern used for the data packet and the bit rate adaptation pattern used for at least one retransmission data packet are substantially identical, with a puncturing rate or repetition rate of the individual bit rate adaptation pattern being identical.

13. A method for transferring data as claimed in claim 1, wherein the bit rate adaptation pattern used for the data packet and the bit rate adaptation pattern used for at least one retransmission data packet is derived from a basic pattern, with a different number of puncturing and repetitions being omitted at a start and at an end of a basic pattern for the bit rate adaptation pattern of the data packet and the bit rate adaptation pattern of the retransmission data packet, and with a total number of puncturings and repetitions remaining constant for the data packet and retransmission data packet.

14. An apparatus for transferring data according to an ARQ method where data is transferred as data packets from the apparatus to a receiver, comprising:
  parts for transmitting a data packet to the receiver;
  parts for transferring, after the transmission of the data packet and upon appropriate request from the receiver, at least one retransmission data packet to the receiver; and
  a bit rate adaptation device for subjecting bits to be transferred in the respective data packet and retransmission data packet to bit rate adaptation before being transferred to the receiver, wherein different bit rate adaptation patterns are used for the respective data packet and retransmission data packet, with the bit rate adaptation being carried out with aid of a bit rate adaptation algorithm which punctures or repeats the bits in the respective data packet and retransmission data packet depending on a value of an appropriate rate adaptation pattern parameter ($e_{ini}$) for bit rate adaptation of the bits in the re-transmission data packet being changed with respect to the bit rate adaptation of the data packet so that after bit rate adaptation, bits with a same information origin are transferred to the receiver in different positions in the respective data packet and retransmission data packet.

15. An apparatus for transferring data as claimed in claim 14, wherein the bit rate adaptation device further comprises a bit separation device for dividing bits of a channel-coded bit flow into a plurality of individual partial bit flows, separate bit rate adaptation facilities assigned to the individual partial bit flows to subject the individual partial bit flows to separate bit rate adaptation, and a bit collection device for combining the bits of the individual partial bit flows output from the separate bit rate adaptation facilities.

* * * * *